United States Patent
Fei et al.

(10) Patent No.: US 12,014,398 B2
(45) Date of Patent: Jun. 18, 2024

(54) SYSTEMS AND METHODS FOR GATING-ENHANCED MULTI-TASK NEURAL NETWORKS WITH FEATURE INTERACTION LEARNING

(71) Applicants: Baidu USA, LLC, Sunnyvale, CA (US); Baidu.com Times Technology (Beijing) Co., Ltd., Beijing (CN)

(72) Inventors: Hongliang Fei, Sunnyvale, CA (US); Jingyuan Zhang, San Jose, CA (US); Xingxuan Zhou, Beijing (CN); Junhao Zhao, Beijing (CN); Banghu Yin, Beijing (CN); Ping Li, Bellevue, WA (US)

(73) Assignees: Baidu USA LLC, Sunnyvale, CA (US); Baidu.com Times Technology (Beijing) Co., Ltd., Beijing (CN)

( * ) Notice: Subject to any disclaimer, the term of this patent is extended or adjusted under 35 U.S.C. 154(b) by 10 days.

(21) Appl. No.: 18/250,525

(22) PCT Filed: Jul. 7, 2021

(86) PCT No.: PCT/CN2021/105051
§ 371 (c)(1),
(2) Date: Apr. 25, 2023

(87) PCT Pub. No.: WO2023/279300
PCT Pub. Date: Jan. 12, 2023

(65) Prior Publication Data
US 2023/0410155 A1    Dec. 21, 2023

(51) Int. Cl.
*G06Q 30/0251* (2023.01)
*G06Q 30/0201* (2023.01)

(52) U.S. Cl.
CPC ..... *G06Q 30/0269* (2013.01); *G06Q 30/0201* (2013.01)

(58) Field of Classification Search
CPC .............. G06Q 30/0269; G06Q 30/0201
See application file for complete search history.

(56) References Cited

U.S. PATENT DOCUMENTS

| 11,580,365 | B2 * | 2/2023 | Lakshmi Narayanan ................... G06N 3/048 |
| 11,610,125 | B2 * | 3/2023 | Lakshmi Narayanan ................... G06N 3/048 |

(Continued)

FOREIGN PATENT DOCUMENTS

| CN | 110162703 A | 8/2019 |
| CN | 111079011 A | 4/2020 |
| CN | 111177575 A | 5/2020 |

OTHER PUBLICATIONS

Devin Soni, Multi-task learning with Multi-gate Mixture-of-expierts, Jun. 28, 2021, Towards Data Science.*

(Continued)

*Primary Examiner* — Arthur Duran
(74) *Attorney, Agent, or Firm* — NORTH WEBER & BAUGH LLP

(57) ABSTRACT

Deep neural network (DNN) models have been widely used for user-relevance content prediction. Presented herein are embodiments of a new user-relevance framework, which may be referred as Gating-Enhanced Multi-task Neural Networks (GemNN) embodiments. Neural network-based multi-task learning model embodiments herein predict user engagement with content in a coarse-to-fine manner, which gradually reduces content candidates and allows parameter sharing from upstream tasks to downstream tasks to improve the training efficiency. Also, in one or more embodiments, a gating mechanism was introduced between embedding layers and multi-layer perceptions to learn feature interactions (Continued)

and control the information flow fed to MLP layers. Tested embodiments demonstrated considerable improvements over prior approaches.

20 Claims, 8 Drawing Sheets

(56) References Cited

U.S. PATENT DOCUMENTS

| | | | | |
|---|---|---|---|---|
| 2019/0266475 | A1* | 8/2019 | Wierstra | G06N 3/092 |
| 2020/0089684 | A1 | 3/2020 | Gotmanov et al. | |
| 2020/0364409 | A1* | 11/2020 | Perez | G06F 40/284 |
| 2020/0364543 | A1* | 11/2020 | Luong | G06N 3/045 |
| 2021/0097126 | A1* | 4/2021 | Martini | G06Q 30/0241 |
| 2021/0097384 | A1 | 4/2021 | Jain et al. | |
| 2022/0004849 | A1* | 1/2022 | Chen | G06N 3/084 |
| 2022/0245490 | A1* | 8/2022 | Aoki | G06N 5/043 |
| 2022/0383200 | A1* | 12/2022 | Chen | G06N 3/045 |
| 2023/0022396 | A1* | 1/2023 | Mitra | G06F 18/2178 |
| 2023/0281448 | A1* | 9/2023 | Ma | G06N 3/045 706/21 |
| 2023/0315745 | A1* | 10/2023 | Lu | G06F 16/24578 707/748 |

OTHER PUBLICATIONS

Rui Mao, Bridging Towers of Multi-task Learning with a Gating Mechanism for Aspect-based Sentiment Analysis and Sequential Metaphor Identifiication, 2021, The Thirty Fifth AAAI Conference on Artificial Intelligence.*
Hongliang Fei, GemNN: Gating Enhanced Multi-Task Neural Networks with Feature Interaction Learning for CTR Prediction, Jul. 15, 2021, SIGIR 21 Virtual Event Canada.*
Huifeng Guo, DeepFM: A Factorization-Machine based Neural Network for CTR Prediction, Mar. 13, 2017, arXiv.*
In Proceedings of the 43rd International ACM SIGIR conference on research and development in Information Retrieval (SIGIR), 2020. (10 pgs).
J. Ma et al.,"Modeling Task Relationships in Multi-task Learning with Multi-gate Mixtureof-Experts," In Proceedings of the 24th ACM SIGKDD International Conference on Knowledge Discovery & Data Mining (KDD), 2018. (10pgs).
J. Pan et al.,"Field-weighted Factorization Machines for Click-Through Rate Prediction in Display Advertising," arXiv preprint arXiv:1806.03514, 2020. (9pgs).
Q. Pi et al.,"Practice on Long Sequential User Behavior Modeling for Click-Through Rate Prediction," arXiv preprint arXiv:1905.09248, 2019. (9pgs).
M. Richardson et al.,"Predicting Clicks: Estimating the Click-Through Rate for New Ads," In Proceedings of the 16th International Conference on World Wide Web (WWW), 2007. (9pgs).
J. Schmidhuber et al.,"Deep Learning in neural networks: An overview," arXiv preprint arXiv: 1404.7828, 2014. (88pgs).
Y. Shan et al.,"Deep Crossing: Web-Scale Modeling without Manually Crafted Combinatorial Features," In Proceedings of the 22nd ACM SIGKDD International Conference on Knowledge Discovery and Data Mining (KDD), 2016. (8 pgs).
International Search Report dated Apr. 8, 2022, in the International Patent Application No. PCT/CN2021/105051. (4 pgs).
International Written Opinion dated Apr. 8, 2022 , in the International Patent Application No. PCT/CN2021/105051. (4 pgs).
Y. Juan et al.,"Field-aware Factorization Machines in a Real-world Online Advertising System," arXiv preprint arXiv:1701.04099, 2017. (9 pgs).
D. P. Kingma et al.,"Adam: A Method for Stochastic Optimization," arXiv preprint arXiv:1412.6980, 2017. (15 pgs).
Y. LeCun et al.,"Deep learning," Nature, vol. 521, 2015. (10psg).

F. Li et al.,"Graph Intention Network for Click-through Rate Prediction in Sponsored Search," arXiv preprint arXiv:2103.16164, 2021. (4pgs).
Z. Li et al.,"Interpretable Click-Through Rate Prediction through Hierarchical Attention," In Proceedings of the Thirteenth ACM International Conference on Web Search and Data Mining (WSDM), 2020. (9 pgs).
Z. Li et al.,"Fi-GNN: Modeling Feature Interactions via Graph Neural Networks for CTR Prediction," arXiv preprint arXiv:1910.05552, 2020. (10pgs).
J. Lian et al.,"xDeepFM: Combining Explicit and Implicit Feature Interactions for Recommender Systems," arXiv preprint arXiv:1803.05170, 2018. (10pgs).
B. Liu et al.,"Feature Generation by Convolutional Neural Network for Click-Through Rate Prediction, "arXiv preprint arXiv: 1904.04447, 2019. (11pgs).
B. Liu et al.,"AutoGroup: Automatic Feature Grouping for Modelling Explicit High-Order Feature Interactions in CTR Prediction,".
W. Song et al.,"AutoInt: Automatic Feature Interaction Learning via Self-Attentive Neural Networks," arXiv preprint arXiv:1810.11921, 2019. (10pgs).
S. Tan et al.,"Fast Item Ranking under Neural Network based Measures," In International Conference onWeb Search and Data Mining (WSDM), 2020. (9 pgs).
M. Tsang et al.,"Feature Interaction Interpretability: A Case for Explaining Ad-Recommendation Systems via Neural Interaction Detection," arXiv preprint arXiv: 2006.10966, 2020. (19pgs).
H. R. Varian,"Position auctions," International Journal of Industrial Organization 25, 6 (2007), 1163-1178, 2007. (16 pgs).
R. Wang et al.,"Deep & Cross Network for Ad Click Predictions," arXiv preprint arXiv: 1708.05123, 2017. (7pgs).
R. Wang et al.,"DCN-M: Improved Deep & Cross Network for Feature Cross Learning in Web-scale Learning to Rank Systems," arXiv preprint arXiv: 2008.13535, 2020. (14pgs).
S. Wu et al.,"TFNet: Multi-Semantic Feature Interaction for CTR Prediction," arXiv preprint arXiv:2006.15939, 2020. (4pgs).
Z. Xu et al.,"Agile and Accurate CTR Prediction Model Training for Massive-Scale Online Advertising Systems," In Proceedings of the 2021 International Conference on Management of Data (SIGMOD), 2021. (6pgs).
N. Xue et al.,"AutoHash: Learning Higher-order Feature Interactions for Deep CTR Prediction," IEEE Transactions on Knowledge and Data Engineering, 2020. (14pgs).
T. Yu et al.,"Combo-Attention Network for Baidu Video Advertising," In Proceedings of the 26th ACM SIGKDD Conference on Knowledge Discovery and Data Mining (KDD), 2020. (9pgs).
S. Zhai et al.,"DeepIntent: Learning Attentions for Online Advertising with Recurrent Neural Networks," In Proceedings of the 22nd ACM SIGKDD International Conference on Knowledge Discovery and Data Mining (KDD), 2016. (10 pgs).
W. Zhao et al.,"Song: Approximate Nearest Neighbor Search on GPU," In Proceedings of the 35th IEEE International Conference on Data Engineering (ICDE), 2020. (12pgs).
W. Zhao et al.,"Distributed Hierarchical GPU Parameter Server for Massive Scale Deep Learning Ads Systems," arXiv preprint arXiv: 2003.05622, 2020. (17pgs).
W. Zhao et al., "AIBox: CTR Prediction Model Training on a Single Node," In Proceedings of the 28th ACM International Conference on Information and Knowledge Management (CIKM), 2019. (10 pgs).
G. Zhou et al.,"Deep Interest Evolution Network for Click-Through Rate Prediction," arXiv preprint arXiv:1809.03672, 2018. (9pgs).
A. Beutel et al.,"Latent Cross: Making Use of Context in Recurrent Recommender Systems," In Proceedings of the Eleventh ACM International Conference on Web Search and Data Mining (WSDM), 2018. (9pgs).
A. Z. Broder, "A Taxonomy of Web Search," SIGIR Forum, vol. 36, No. 2, 2002. (9pgs).
H. T. Cheng et al.,"Wide & Deep Learning for Recommender Systems," arXiv preprint arXiv:1606.07792, 2016. (4pgs).
W. Cheng et al.,"Adaptive Factorization Network: Learning Adaptive-Order Feature Interactions," In Proceedings of the Thirty-Fourth AAAI Conference on Artificial Intelligence (AAAI-20), 2020. (8pgs).

(56) References Cited

OTHER PUBLICATIONS

K. Cho et al.,"Learning Phrase Representations using RNN Encoder-Decoder for Statistical Machine Translation," arXiv preprint arXiv:1406.1078, 2014. (15pgs).
P. Covington et al.,"Deep Neural Networks for YouTube Recommendations," In Proceedings of the 10th ACM Conference on Recommender Systems (RecSys), 2016. (8 pgs).
B. Edelman et al.,"Internet Advertising and the Generalized Second-Price Auction: Selling Billions of Dollars Worth of Keywords," American Economic Review, vol. 97, No. 1, 2007.(18pgs).
G. Zhou et al.,"Deep Interest Network for Click-Through Rate Prediction," arXiv preprint arXiv: 1706.06978, 2018. (9 pgs).
Z. Zhou et al.,"Möbius Transformation for Fast Inner Product Search on Graph," In Advances in Neural Information Processing Systems (NeurIPS), 2019. (12 pgs).
B. Edizel et al.,"Deep Character-Level Click-Through Rate Prediction for Sponsored Search," arXiv preprint arXiv:1707.02158, 2017. (10pgs).
D.C.Fain et al.,"Sponsored search: A Brief History," Bulletin of the American Society for Information Science and Technology 32, 2, 2006. (3pgs).
M. Fan et al.,"Mobius: Towards the Next Generation of Query-Ad Matching in Baidu's Sponsored Search," In Proceedings of the 25th ACM SIGKDD International Conference on Knowledge Discovery & Data Mining (KDD), 2019. (9pgs).
H. Fei et al.,"Sample Optimization for Display Advertising," In Proceedings of the 29th ACM International Conference on Information and Knowledge Management (CIKM) Virtual Event, 2020. (4pgs).
Y. Feng et al.,"Deep Session Interest Network for Click-Through Rate Prediction," arXiv preprint arXiv: 1905.06482, 2019. (7pgs).
F.A. Gers et al.,"Learning to Forget: Continual Prediction with LSTM," Neural Comput. 12 (10), 2000.(5pgs) [Abstract Only].
T. Graepel et al.,"Web-Scale Bayesian Click-Through rate Prediction for Sponsored Search Advertising in Microsoft's Bing Search Engine," In Proceedings of the 27th International Conference on Machine Learning (ICML), 2010. (8 pgs).
H. Guo et al.,"DeepFM: A Factorization-Machine based Neural Network for CTR Prediction," arXiv preprint arXiv:1703.04247, 2017. (8pgs).
H. Guo et al.,"DeepFM: An End-to-End Wide & Deep Learning Framework for CTR Prediction," arXiv preprint arXiv:1804.04950, 2018. (14pgs).
W. Guo et al.,"Order-aware Embedding Neural Network for CTR Prediction," In Proceedings of the 42nd International ACM SIGIR Conference on Research and Development in Information Retrieval (SIGIR), 2019. (4psg).
X. He et al.,"Practical Lessons from Predicting Clicks on Ads at Facebook," In Proceedings of the Eighth International Workshop on Data Mining for Online Advertising (ADKDD), 2014. (9pgs).
P.S.Huang et al.,"Learning deep structured semantic models for web search using clickthrough data," In Proceedings of the 22nd ACM International Conference on Information and Knowledge Management (CIKM), 2013. (8pgs).
T. Huang et al.,"GateNet:Gating-Enhanced Deep Network for Click-Through Rate Prediction," arXiv preprint arXiv: 2007.03519, 2020. (7pgs).
T. Huang et al., "FiBiNET: Combining Feature Importance and Bilinear feature Interaction for Click-Through Rate Prediction," arXiv preprint arXiv:1905.09433, 2019. (8pgs).

* cited by examiner

300

---

Given a user query comprising one or more words and a first set of candidate contents, use a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents ⸺ 305

↓

Use a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user ⸺ 310

↓

Use a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user ⸺ 315

↓

Output the final set of candidate contents with material type information ⸺ 320

FIG. 3

SYSTEMS AND METHODS FOR GATING-ENHANCED MULTI-TASK NEURAL NETWORKS WITH FEATURE INTERACTION LEARNING

CROSS-REFERENCE TO RELATED APPLICATIONS

This patent application is filed pursuant to 35 USC § 371 as a US National Phase Application of International Patent Application No. PCT/CN2021/105051, filed on 7 Jul. 2021, entitled "SYSTEMS AND METHODS FOR GATING-ENHANCED MULTI-TASK NEURAL NETWORKS WITH FEATURE INTERACTION LEARNING," listing Hongliang Fei, Jingyuan Zhang, Xingxuan Zhou, Junhao Zhao, Banghu Yin, and Ping Li as inventors, which patent document is incorporated by reference herein in its entirety and for all purposes.

TECHNICAL FIELD

The present disclosure relates generally to systems and methods for computer learning that can provide improved computer performance, features, and uses. More particularly, the present disclosure relates to systems and methods for providing relevant content to a user.

BACKGROUND

Deep neural networks (DNNs) have achieved great successes in many domains, such as computer vision, natural language processing, recommender systems, etc. An area of particular importance is using neural networks to help return relevant content to a user. For example, the Internet comprises almost endless amounts of content. There are also numerous service providers/content providers that seek to provide relevant content to end users. At times, simply considering the query in seeking to find relevant content may be insufficient to return relevant content. Also, how related or relevant content is presented to the user can also play an important role in whether a user will consider or appreciate the information that is provided. One measure of the interest of the content to a user is if the user selects (e.g., "clicks") a link associated with the served content. Content providers track the selection of offered content by tracking whether a user selects/clicks on the content. One measure of user-selection of content is called "click-through rate (CTR)." Trying to predict a CTR for content or information provided to a user is complex and multifaceted. To add to the prediction problem, users are very averse to delays in receiving content. Thus, any systems and methods for predicting relevant content and its presentation characteristics must be done quickly or users will be dissatisfied even if they ultimately do receive very high-quality relevant content.

Accordingly, what is needed are systems and methods for predicting relevance of content for users.

SUMMARY

Embodiments of the present disclosure provide a computer-implemented method for delivering content to a user, a system, and a non-transitory computer-readable medium or media.

In a first aspect, some embodiments of the present disclosure provide a computer-implemented method for delivering content to a user, the method incudes: given a user query comprising one or more words and a first set of candidate contents, using a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents; using a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user; using a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user; and outputting the final set of candidate contents with style type information.

In a second aspect, some embodiments of the present disclosure provide a system, the system includes one or more processors; and a non-transitory computer-readable medium or media comprising one or more sets of instructions which, when executed by at least one of the one or more processors, causes steps to be performed comprising: given a user query comprising one or more words and a first set of candidate contents, using a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents; using a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user; using a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user; and outputting the final set of candidate contents with style type information.

In a third aspect, some embodiments of the present disclosure provide a non-transitory computer-readable medium or media comprising one or more sequences of instructions which, when executed by at least one processor, causes steps to be performed comprising: given a user query comprising one or more words and a first set of candidate contents, using a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents; using a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user; using a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user; and outputting the final set of candidate contents with style type information.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 3 depicts a method for delivery content to a user, according to embodiments of the present disclosure.

DETAILED DESCRIPTION OF EMBODIMENTS

Figure 1:
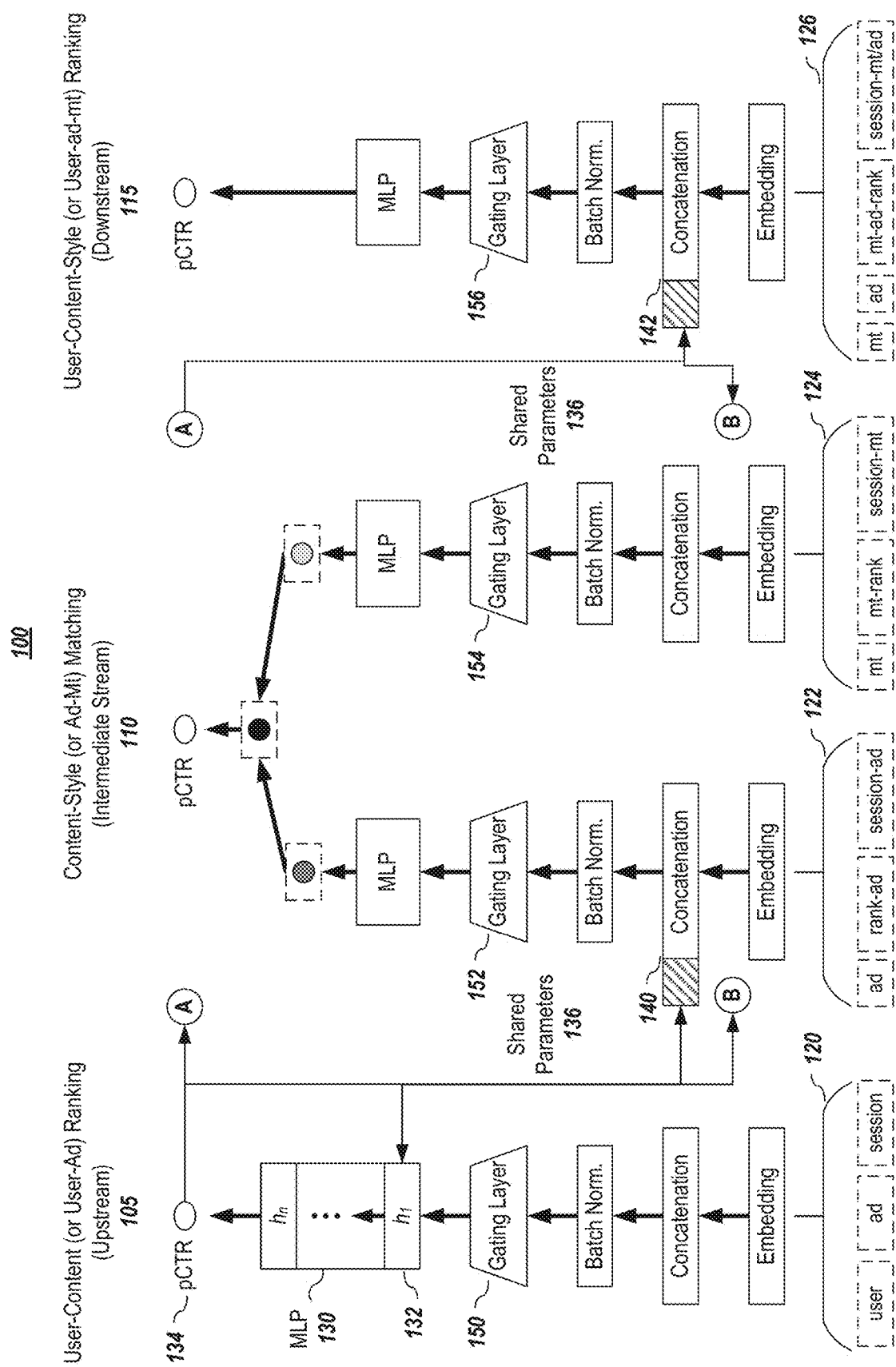
FIG. 1 depicts a multi-task neural network model with parameter sharing, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of click-through-rate and serving ad content, aspects of the present disclosure are not so limited. Accordingly, aspects of the present disclosure may be applied or adapted for use in other contexts-including but not limited to identifying and returning any type of relevant content.

A. General Introduction

Identifying and returning relevant content to users is a fundamental aspect of the Internet and other networks. Different metrics may be used to gauge the relevance of the presented content to a user, but one of the most telling is whether the user selects the content. A common measure of user selection is click-through-rate (CTR) because it directly indicates which content items were relevant to the user as determined by the user selecting it.

One application of CTR is in advertising, and CTR prediction is an important task in online advertising systems. In cost-per-click (CPC) advertising systems, the expected revenue is measured by cost per mille (CPM), which is the product of the bid price and CTR. Obviously, the accuracy of CTR prediction has a crucial impact on the revenue, and intensive efforts have been devoted to improving CTR models. Industrial advertising systems usually select and rank ads from millions of candidates. It is a common practice to leverage a multi-layer funnel-shaped structure with several stages to deliver ads: the candidate generation stage and the re-ranking stage. The candidate generation stage reduces the corpus size from millions to thousands or hundreds, and the re-ranking stage estimates CTR and CPMs of ad candidates and delivers top-ranked ads to users. During the re-ranking stage, deep neural network (DNN) based models have been widely used. The solution framework usually follows a similar paradigm: embedding layers followed by a multi-layer perception (MLP). For those models, large-scale sparse input features are first converted into embedding vectors, then projected into fixed-length vectors, and concatenated to feed into several fully-connected (FC) layers to learn the nonlinear relations among features. Note that there may be several sub-steps in the re-ranking stage in industrial advertising systems, in which there is one neural model for each sub-step to reduce ad candidates. For example, ads may be ranked first based on user query and ad features, then ad material types and possible rank information may be incorporated to re-rank ads and finally deliver a few top ads to users.

However, there are well-known challenges in industrial settings. First, users, ads, and ad material types (i.e., style/presentation types) are normally characterized by large-scale categorical features, which result in a tremendous amount of model parameters due to the sparse feature embeddings.

Second, effective feature interactions tend to be extremely important to CTR models' success since they provide additional interaction information beyond individual features. Nevertheless, recent research revealed that vanilla DNNs cannot even efficiently approximately model $2^{nd}$-order or $3^{rd}$-order feature interactions. Therefore, learning effective feature interactions is a critical issue for CTR models. Several attempts have been made to handle feature interactions, but very few of these attempts studied this issue under computation and latency constraints in real industrial production settings.

There is a history of development in advertising technologies at Baidu Search Ads (a.k.a., "Phoenix Nest"). As early as 2013, Baidu adopted Message Passing Interface (MPI)-based distributed deep learning platforms for CTR models. Recently, GPU-based ads systems (i.e., "PaddleBox," available at paddlepaddle.org.cn), have replaced CPU-MPI platforms. Another major effort is the use of approximate near neighbor search and maximum inner product search to improve quality of recalls in the early stage of the training pipeline.

To address these deficiencies embodiments of a relevance framework were developed and are described herein. Embodiments may be used as a CTR training framework and, once trained, may be deployed in production setting. Embodiments herein may be referred to generally, for convenience, as Gating-enhanced Multi-task Neural Networks (GemNN) or GemNN embodiments. Embodiments comprise a neural-network-based multi-task learning model to predict CTR in a coarse-to-fine manner, which gradually reduces ad candidates and allows parameter sharing from upstream tasks to downstream tasks to improve the training efficiency. Also, one or more embodiments comprise a gating mechanism between embedding layers and MLP to learn feature interactions and control the information flow fed to MLP layers, which allows embodiments to simultaneously model feature interactions and learn bit-wise level feature importance for the input to MLP. Embodiments also allow parameter sharing from upper-level tasks to lower-level tasks to improve training efficiency. Unlike ordinary multi-task neural network models that share intermediate layers among tasks, one or more embodiments leverage commonalities between upstream and downstream tasks to share parameters and avoid duplicated computation. Tested embodiments achieved considerable improvements in offline AUC (Area under Curve, which may be a ROC (Receiver operating characteristic) curve) and online metric cost per mille (CPM). Extensive experiments of embodiments also demonstrated the multi-task model's utility and the choice of placing the gating layer.

1. Related Works

Recent research has been performed on feature interaction learning. Most notably, DCN (Ruoxi Wang, Bin Fu, Gang Fu, and Mingliang Wang. 2017. Deep & Cross Network for Ad Click Predictions. In *Proceedings of the ADKDD'17*. Halifax, Canada, 12:1-12:7, which is incorporated by reference herein in its entirety) and DCN-M (Ruoxi Wang, Rakesh Shivanna, Derek Z Cheng, Sagar Jain, Dong Lin, Lichan Hong, and Ed H Chi. 2020. DCN-M: Improved Deep & Cross Network for Feature Cross Learning in Web-scale Learning to Rank Systems. arXiv preprint arXiv:2008.13535 (2020), which is incorporated by reference herein in its entirety) learned effective explicit and implicit feature interactions at embedding layers and crossing layers.

AutoInt (Weiping Song, Chence Shi, Zhiping Xiao, Zhijian Duan, Yewen Xu, Ming Zhang, and Jian Tang. 2019. AutoInt: Automatic Feature Interaction Learning via Self-Attentive Neural Networks. In *Proceedings of the 28th ACM International Conference on Information and Knowledge Management (CIKM)*. Beijing, China, 1161-1170, which is incorporated by reference herein in its entirety) modeled feature interactions via self-attention.

GateNet (Tongwen Huang, Qingyun She, ZhiqiangWang, and Junlin Zhang. 2020. GateNet: Gating-Enhanced Deep Network for Click-Through Rate Prediction. arXiv preprint arXiv:2007.03519 (2020), which is incorporated by reference herein in its entirety) utilized gating layers within each feature field and MLP to select latent information at the feature-level. While embodiments of the framework herein also leverage a gating mechanism, there are some important differences. Embodiments herein use gating to control salient latent information flow, and in one or more embodiments the gating layer is positioned between the embedding layer and MLP. This placement is not only structurally different but produces functional differences. In one or more embodiments, the gating is applied to all features instead of each feature field individually. The superiority of this configuration is demonstrated below through both offline and "online" evaluations. Note that the online tests were performed in a private system not accessible by the public. Compared with DCN-M on gating perspective, embodiments may be considered as simpler and do not employ a mixture of experts. Also, embodiments effectively share parameters for the re-ranking task.

B. Systems and Methodology Embodiments

In this section, embodiments of the multi-task model are described that learn feature interactions for CTR prediction. Given a user's query and its relevant content candidates (e.g., ad candidates) from the retrieval stage, embodiments of the framework aim for delivering several highly ranked contents (e.g., ads) to users, including both ranks and their corresponding style or material types (mt) (e.g., size, position, representation, etc.). Although, in one or more embodiments, a much smaller ad candidate space exists after the retrieval stage, the combinatory space across ads, ranks, and style/material types is still huge.

1. Multi-Task Neural Network-Based Model Embodiments

To develop feasible solutions under computation and latency constraints in real-production settings, the re-ranking procedure was decomposed into three tasks in a coarse-to-fine manner. For each task, a GemNN embodiment starts with an embedding layer, followed by one gating layer that models explicit feature interactions and selects salient feature information. Meanwhile, parameter sharing from the coarse (upstream) task to fine (downstream) level tasks is allowed.

FIG. 1 depicts a multi-task neural network model 100 with parameter sharing, according to embodiments of the present disclosure. In one or more embodiments, input features (e.g., features 120, 122, 124, and 128) are either one-hot or multi-hot vectors in a multigroup categorical form. In one or more embodiments, the first layer 132 of the MLP 130 and the predicted user selection (e.g., predicted CTR) 134 from the user-content ranking task model (built on common features of users and content (e.g., ads)) are shared 136 to the other two task models as illustrated in FIG. 1.

During training, the shared pCTR feature 134 may be frozen. In one or more embodiments, the MLP used in the user-content task 105 has five layers and has two layers for the other two tasks (i.e., content-style task 110 and user-content-style task 115). All tasks may be cast as binary classification problems of whether the user selects or does not select the content. Double arrows indicate that gradients may be backpropagated to shared parameters h1 132 in the user-content task 105.

Presented below are more details about the three tasks and how a gating mechanism is introduced into these task models.

a) User-Content Ranking (UCR) Embodiments

This is a coarse-level task, which takes user query and content candidates (e.g., ad candidates) from a retrieval stage to generate a shorter list (e.g., <20). In one or more embodiments, the task model may be cast as a binary classification problem, and a cross-entropy loss that is commonly used for learning-to-rank systems, especially with a binary label (e.g., click or not), may be used for training. In one or more embodiments, since rough features of ads, such as ids and bidding words, are used, this task may serve as a retrieval model to reduce content (e.g., ad) space. As illustrated in FIG. 1, the UCR task model 105 may receive a number of different features 120, such as user features, content (e.g., ad) features, and session features.

Examples of user features include, but are not limited to: user id, user's big data portrait (e.g., age, gender, education, etc.), user search query (and its related features (e.g., length, terms, word types, etc.)), device information (e.g., operating system (OS) type, browser version, device id, etc.), context data (e.g., network IP, province, city, network type (wifi/3G/4G/unknown), etc.), historical data of user within a set period (e.g., 7 days), etc. Examples of content features include, but are not limited to: content id, title, description, keywords, tags, a match mode of this content (exactly the same/similar), etc. Examples of session features include, but are not limited to: short-time historical data of the user (e.g., the show/click of contents' feature values by this user within a time period (e.g., 24 hours)).

b) Content-Style Matching (CSM) Embodiments

Given the top content candidates from the user-content ranking task, the CSM task model 110 selects style (or material) types for each content candidate such that it will have a higher probability of being selected (e.g., clicked) by the user.

In one or more embodiments, a two-tower styled deep neural network model 110 is used to match content (e.g., ads) and all possible style types. One benefit for using a two-tower model 110 is that style-type feature embeddings may be pre-computed and indexed, which will save a significant amount of time during content serving, such as serving ads. Similar to the user-content ranking task, this task is also cast as a binary classification problem. Clicked content, such as clicked links, images, text, or ads, with a certain style type may be used as positive samples, and non-clicked ads with style types may be used as negatives samples for training purposes.

Note that, in one or more embodiments, the input features 122 and 124 for the two-tower include features, including joint features. In one or more embodiments, this task model 110 obtains input features of user-ad (or user-content) ranking by shared parameters. Some examples of additional features are content features, rank-content features, and session-content features. Examples of the ad (or content) features include, but are not limited to: charge name, placement id, and rank. Examples of the rank-ad (or rank-content) joint features include, but are not limited to: placement id-rank-ad id, and advertiser id-placement id-rank. Examples of the session-ad (or session-content) joint features include, but are not limited to: short-time historical data of the user (e.g., show/click of ad's feature values by this user within a time period (e.g., 24 hours)).

c) User-Content-Style Ranking (UCSR) Embodiments

Given a shorter list of candidate contents from user-content ranking and selected style types from content-style matching, in one or more embodiments, UCSR may leverages all available features (or a subset thereof) to generate the final top contents with style type information, which may be based on projected CPMs. This task is the most fine-grained one, which may be used to estimate CTR and CPM based on all possible displayed content queues. Similar to the previous two tasks, this task may be cast as a binary classification problem.

It shall be noted that this task obtains input features of User-Content ranking 105 by shared parameters 136. In one or more embodiments, it also receives additional features; some example features that may be used as inputs to the UCSR task model may include style (or material type), content (e.g., ad), style-content-rank, and session-style/content features 126. Examples of the style (or material type) features include, but are not limited to: material type id, style id, the number of pictures, picture id, etc. Examples of the content (or ad) features include, but are not limited to: title length, width, height, the match model of this content (exactly the same/similar). Examples of the style-content-rank (or mt-ad-rank) features include, but are not limited to: material type id-ad id-placement id-rank, and width-height-material type id. Examples of the session-style/content (or session-mt/ad) features include, but are not limited to: a short-time historical data of the user (e.g., the show/click of ad and mt's feature values by this user within a time period (e.g., 24 hours)).

From the above description, it was found that the three tasks actually share several common features among users and contents. It is reasonable to enable parameter sharing from coarse tasks to finer tasks to avoid duplicated modeling on those features. Towards that end, embodiments comprise a parameter sharing mechanism 136 as shown in FIG. 1. In one or more embodiments, the common features of users and contents are used to build UCR model 105, and then share the first layer 132 of MLP 130 from UCR 105 and its predicted CTR (pCTR) value 134 to the CSM task 110 and UCSR task 115. Particularly, in one or more embodiments, the shared parameters 136 are concatenated 140, 142 with the embedding layer in CSM (left tower) 110 and UCSR 115 as warm-started features.

In one or more embodiments, during training, the three tasks may be jointly optimized and the shared MLP layer from UCR task model 105 may be updated while freezing the shared pCTR feature. Such a design seamlessly connects the three tasks and allows parameter sharing from upstream tasks to downstream tasks. In one or more embodiments, the three tasks use cross entropy (CE) as loss functions, and a total final loss may be the sum of the three individual loss functions. In one or more embodiments, in training, a set of ground-truth training data is used in which predicted values are compared with ground-truth values to compute loss.

2. Gate-Enhanced Multi-Task NN Model Embodiments

A form of a gating mechanism has been widely adopted in many well-known deep models. Gates normally output a scalar, which represents the importance of the whole vector embedding. In GateNet, they learn the bit-level salient information in the feature embedding so that they can enable gate output to contain fine-grained information about the feature embedding. GateNet has demonstrated the benefit of bit-level versus vector-level weights.

Figure 2:
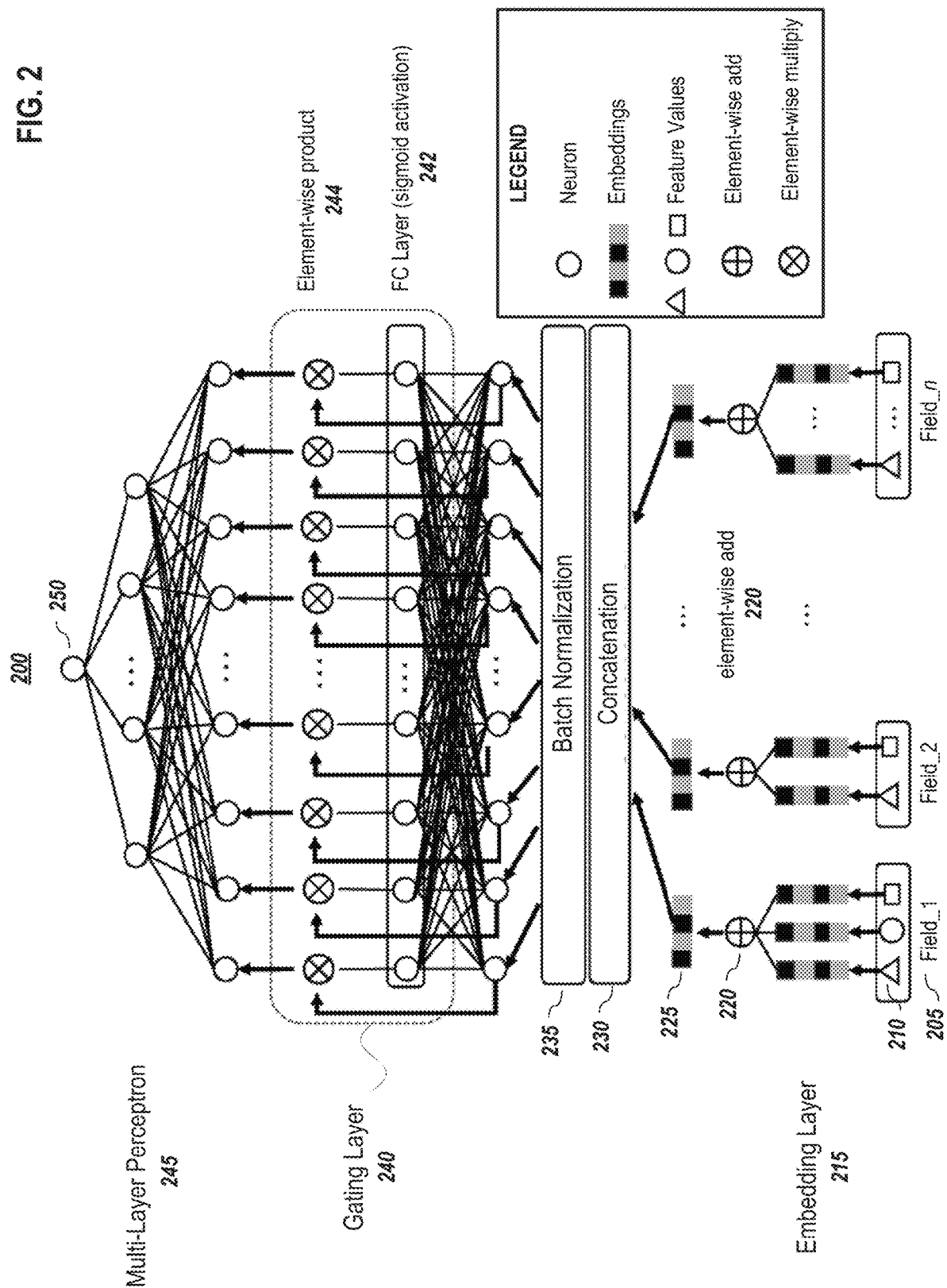
FIG. 2 depicts a deep neural network model with a gating layer, according to embodiments of the present disclosure.

In one or more embodiments, a gating mechanism is used to control salient information flow to downstream layers as shown in FIG. 2. FIG. 2 depicts a gating layer 240 for a deep neural network model 200, according to embodiments of the present disclosure. FIG. 2 depicts a general DNN architecture for demonstration purposes, but in one or more embodiments, a gating layer 240 is inserted between a normalization layer 235 and a MLP 245 for each DNN module (e.g., UCR model 105, CSM model 110, and UCSR model 115) in FIG. 1 to control the salient information flow. In one or more embodiments, sum-pooling for multi-hot features is performed. (indicates element-wise addition, and 0 indicates element-wise product.

Different from GateNet, embodiments of the gating layer (e.g., gating layers 150, 152, 154, and 156) are placed between the embedding layer (after batch normalization) and MLP for every DNN module in FIG. 1. Therefore, in one or more embodiments, gating is applied on all concatenated feature bits (i.e., neuron units) instead of each feature field. Note that, in one or more embodiments, gating layers are not shared among tasks. Instead, in one or more embodiments, downstream tasks are left to learn their gating weights for the shared parameters since we want to reevaluate the importance for them. Mathematically, let $E=[e_1, e_2, \ldots, e_n]^T$ be the concatenated embeddings, where n is the number of feature slots and $e_i \in \mathcal{R}^d$ is the embedding vector for field i. In one or more embodiments, the gate values are calculated, which represents the bit-level importance of concatenated embedding E as $G=[g_1, g_2, \ldots, g_n]^T = \text{act}(W*E+b)$, where act(.) is the activation function, $b=[b_1, b_2, \ldots, b_n]^T$ is the bias term and $b_i \in \mathcal{R}^d$. Both $W \in \mathcal{R}^{nd \times nd}$ and b are trainable parameters. In one or more embodiments, sigmoid activation function is used and d=16 in experiments.

With bit-level importance vector G, the input to MLP may be computed as $Y=[g_1 \otimes e_i, g_2 \otimes e_2, \ldots, g_n \otimes e_n]$, where $\otimes$ indicates element-wise product. Hence, the input Y is filtered embeddings, which is controlled by bit-wise gate values. Since the gating layer is applied on all feature fields, GemNN embodiments implicitly learn feature interactions and use them to decide gating values.

3. Inference/Deployed Embodiments

FIG. 3 depicts a method for delivering content to a user, according to embodiments of the present disclosure. In one or more embodiments, given a user query comprising one or more words and a first set of candidate contents (e.g., ads), a user-content ranking task model of a multi-task neural network (GemNN) model is used (305) to obtain a set of top candidate contents from the set of candidate contents and a projected user-selection rate for each of the top candidate contents in the set of top candidate contents. In one or more embodiments, the user-content ranking task model of the GemNN model receives the user query and user-related data as inputs.

A content-style matching task model of the GemNN model and the set of top candidate contents, the projected user-selection rate for each of the top candidate contents, and potential style types for the top candidate contents are used (310) as inputs to the content-style matching task model of the GemNN model to obtain a set of ranked style type information for at least some of the candidate contents in the set of top candidate contents based upon a predicted probability of being selected by the user.

In one or more embodiments, a user-content-style ranking task model of the GemNN model and the set of top candidate contents, the projected user-selection rate for each of the top candidate contents, and the set of ranked style type information for at least some of the candidate contents in the set of top candidate are used (315) as inputs to the user-content-style ranking task model of the GemNN model to obtain a final set of candidate contents with style type information based at least in part on predicted probability of being selected by the user.

Given the final set, the final set of candidate contents with style type information may be output (320). Additionally, or alternatively, the final set of candidate contents with the style type information may be presented to the user. For example, if the content type is ads, the final set of ads with their style type (e.g., size, placement, type, number of images, content, links, audio, video, etc.) may be served to the user. Thus, based upon the user and the user's query, relevant content with appropriate style/presentation type is provided to the user.

As noted above, at least one of the user-content ranking task model, the content-style matching task model, and the user-content-style ranking task model comprises: an embedding layer that receives input features and embeds them into embeddings; a concatenation layer that concatenates the embeddings; a batch normalization layer that receives an output from the concatenation layer; a gating layer that is positioned between the embedding layer and a Multi-Layer Perception (MLP) and performs gating on concatenated features bits instead of each feature field individually; and the Multi-Layer Perception (MLP) that receives an output of the gating layer.

In one or more embodiments, parameters of a first layer of a Multi-Layer Perception (MLP) from the user-content ranking task model of the GemNN and the projected user-selection rate for each of the top candidate contents in the set of top candidate contents from the user-content ranking task model of the GemNN are shared with the content-style matching task model and the user-content-style ranking task model of the GemNN model. In one or more embodiments, the shared parameters are concatenated with an embedding layer of the content-style matching task model of the GemNN model and with an embedding layer of the user-content-style ranking task model of the GemNN model.

In one or more embodiments, the user-content ranking task model, the content-style matching task model, and the user-content-style ranking task model are jointly optimized during training, which comprises updating the parameters of the first layer of the Multi-Layer Perception (MLP) from the user-content ranking task model while freezing the shared projected user-selection rate for each of the top candidate contents in the set of top candidate contents from the user-content ranking task model.

In one or more embodiments, the content-style matching task model of the GemNN model comprises a two-tower neural network model to match content and possible style types, in which style-type feature embeddings are pre-computed and indexed.

C. Experimental Results

It shall be noted that these experiments and results are provided by way of illustration and were performed under specific conditions using a specific embodiment or embodiments; accordingly, neither these experiments nor their results shall be used to limit the scope of the disclosure of the current patent document.

A period of user click history logs were collected from Baidu's search system for evaluation. The size of the training data is around 56 billion. There were 252, 65, and 102 feature slots for UCR, CSM, and UCSR, respectively. Both offline and online evaluations were performed. The offline testing data size was about 500 million, and the AUC of CTR prediction. The trained GemNN model was evaluated over the production environment of a search engine in an A/B testing manner. The relative improvement of online CPM is also reported as $(CPM_{new}-CPM_{old})/CPM_{old}$, where CPM=bid×CTR.

1. Performance Evaluation

GemNN embodiments were compared with three baselines: GateNet, AutoInt, and DCN-M. For all methods, the embedding dimension was 16 and the total number of features after embedding was around 100 billion. Adam optimizer was applied with a mini-batch size of 2048. The learning rate, the number of hidden layers, and the hidden dimension were set via a grid search for each sub-task. The number of hidden layers ranged from 3 to 6, with the hidden dimension from 16 to 1024. The learning rate ranges from 5.5e-6 to 8.5e-6. For GateNet, a bit-wise hidden gate was inserted into MLP layers. For AutoInt, the number of attention heads was 4, and the attention embedding size was 64. For DCN-M, a stacked structure with two cross layers was used. The number of experts was 3, and the rank of the weight matrix was 128. TABLE 1 lists the best AUC performance of different models over different sub-tasks. The percentage value in "(•)" is the improvement over GateNet. Note that for a commercial search engine with massive user activities, an improvement of 0.1% in AUC is usually considered as significant for the CTR prediction and it will lead to a large increase in returning relevant content (and a large increase in revenue). It is observed that the GemNN embodiment achieves the best performance on the AUC offline evaluation. Compared with GateNet and DCN-M with the gating mechanism, the GemNN embodiment has significant improvements on all the tasks, showing the effectiveness of the multi-task learning procedure. In addition, the GemNN embodiment outperformed AutoInt. It implies that the multitask learning procedure plus the gating mechanism can help capture feature interactions more effectively than self-attention. To summarize, with multi-task learning and the gating strategy, the GemNN embodiment obtains the best results.

TABLE 1

Performance of AUC for different models.

| Method/Model | User-Ad Ranking (UAR) | Ad-Material-Type Matching (AMM) | User-Ad-Material-Type Ranking (UAMR) |
|---|---|---|---|
| GateNet | 0.8106 | 0.8211 | 0.8238 |
| AutoInt | 0.8198 (+0.92%) | 0.8314 (+1.03%) | 0.8313 (+0.75%) |
| DCN-M | 0.8212 (+1.06%) | 0.8343 (+1.32%) | 0.8359 (+1.21%) |
| GemNN Embodiment | 0.8221 (+1.15%) | 0.8355 (+1.44%) | 0.8373 (+1.35%) |

2. Analysis

In this section, experiments were conducted to study the influence of the gating mechanism in GemNN embodiments under different settings. Then, an ablation study was conducted to analyze the contribution of multi-task learning and gating in GemNN embodiments.

a) Activation Function Study

Figure 4:
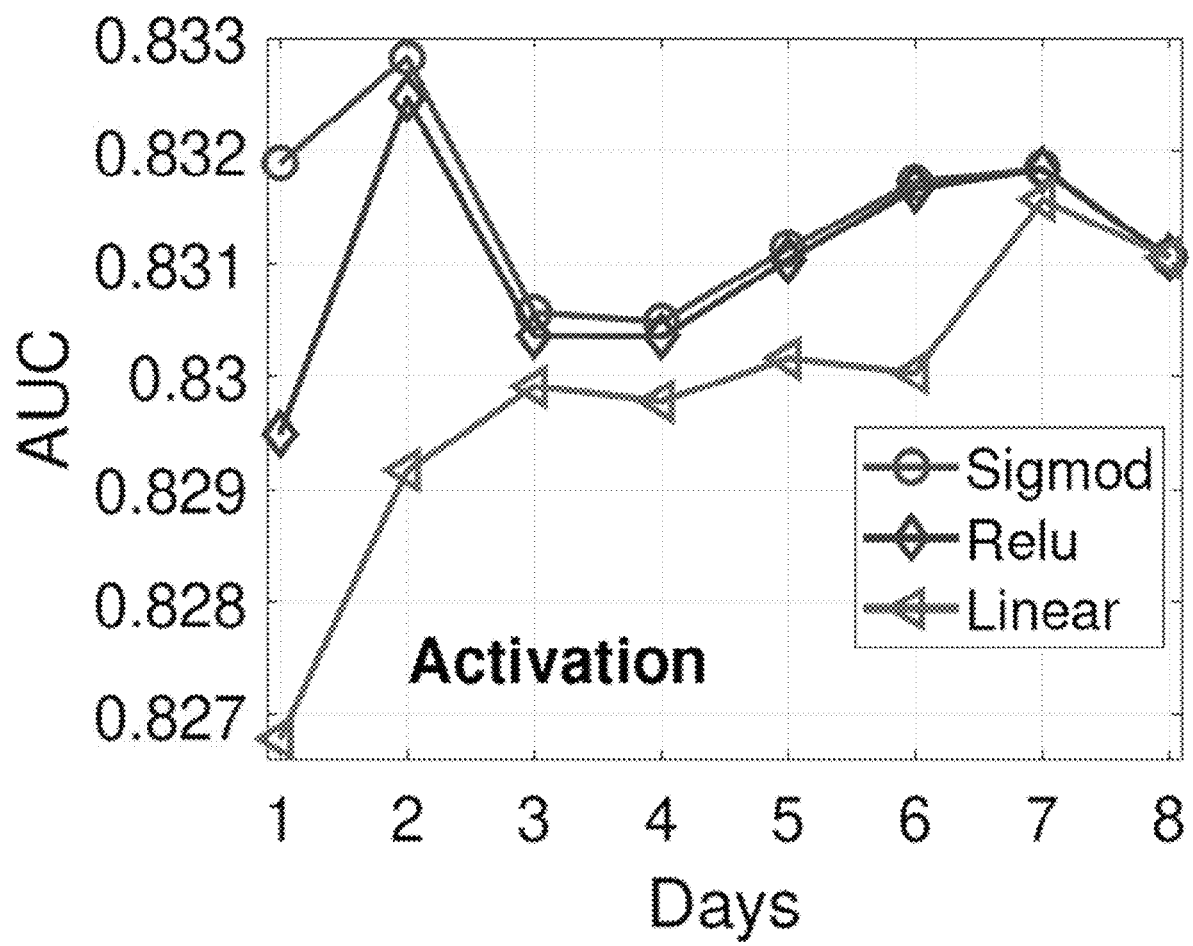
FIG. 4 depicts performance of different activations applied to the gating layer, according to embodiments of the present disclosure.

Different activation functions may be applied to the gating layer of a GemNN embodiment. In the experiment, Linear, ReLu, and Sigmoid functions were tested, and the AUC performance on UAMR is shown in the FIG. 4. It was observed that ReLu outperformed the linear function, and the best activation function on the gating layer was Sigmoid. Compared with Sigmoid, ReLu can achieve similar results. In practice, either ReLu or Sigmoid may be chosen as the activation function of the gating layer. In experiments, Sigmoid activation was used.

b) Gating Layer Position Study

Figure 5:
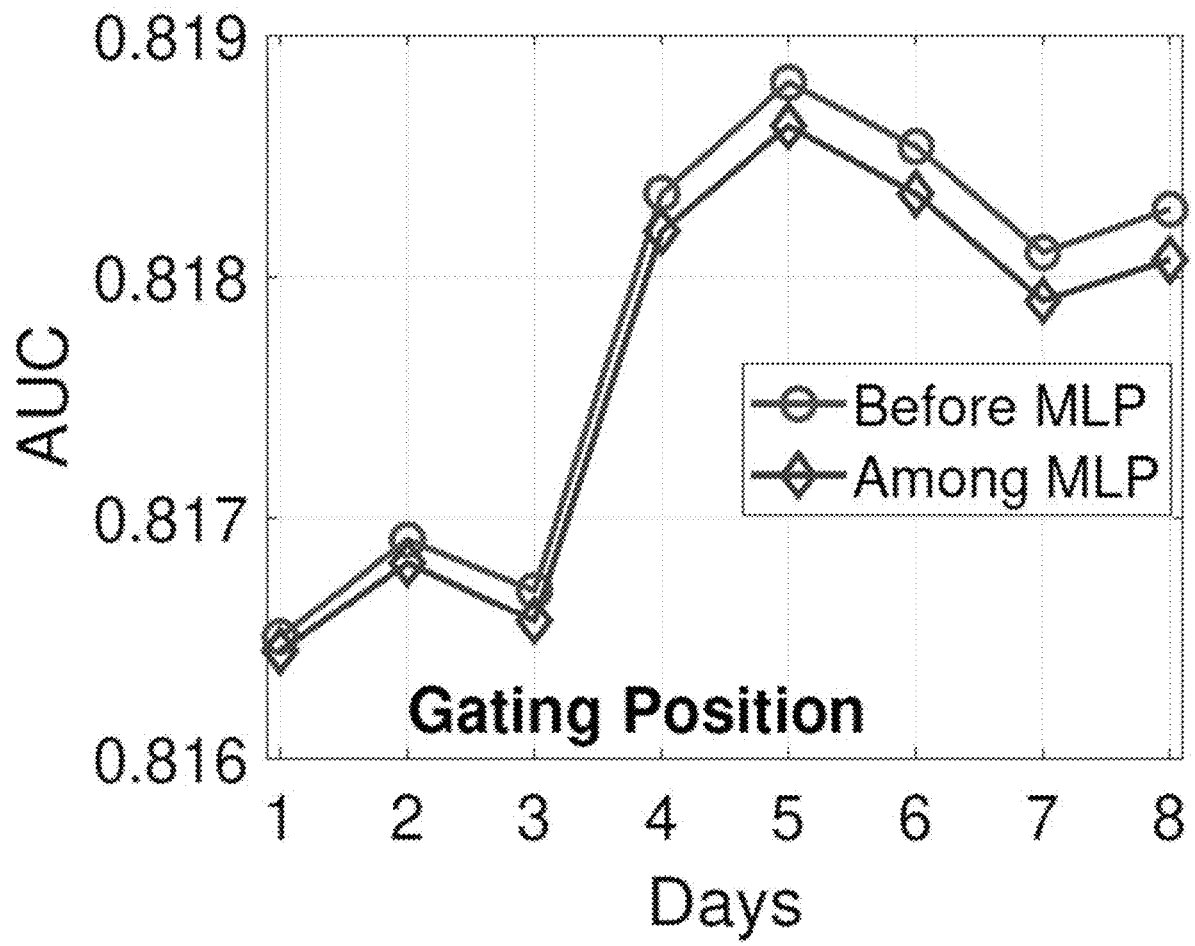
FIG. 5 shows the AUC performance on an UAR task with differ gating layer positions, according to embodiments of the present disclosure.

The gating layer may be placed either into the MLP hidden layers, or between embedding layers and MLP. The former approach applies gating on the feature field individually, while the latter focuses on all the features to model high-order interactions among different fields. Here it was studied how the gating layer's different positions influence the results of GemNN embodiments. FIG. 5 shows the AUC performance on an UAR with different gating positions, according to embodiments of the present disclosure. It was observed that the gating mechanism between embedding layers and MLP helped the GemNN embodiment capture the implicit high-order feature interactions more effectively. Therefore, in one or more embodiments, the gating layer is positioned between embedding layers and MLP.

c) Gating Granularity Study

Figure 6:
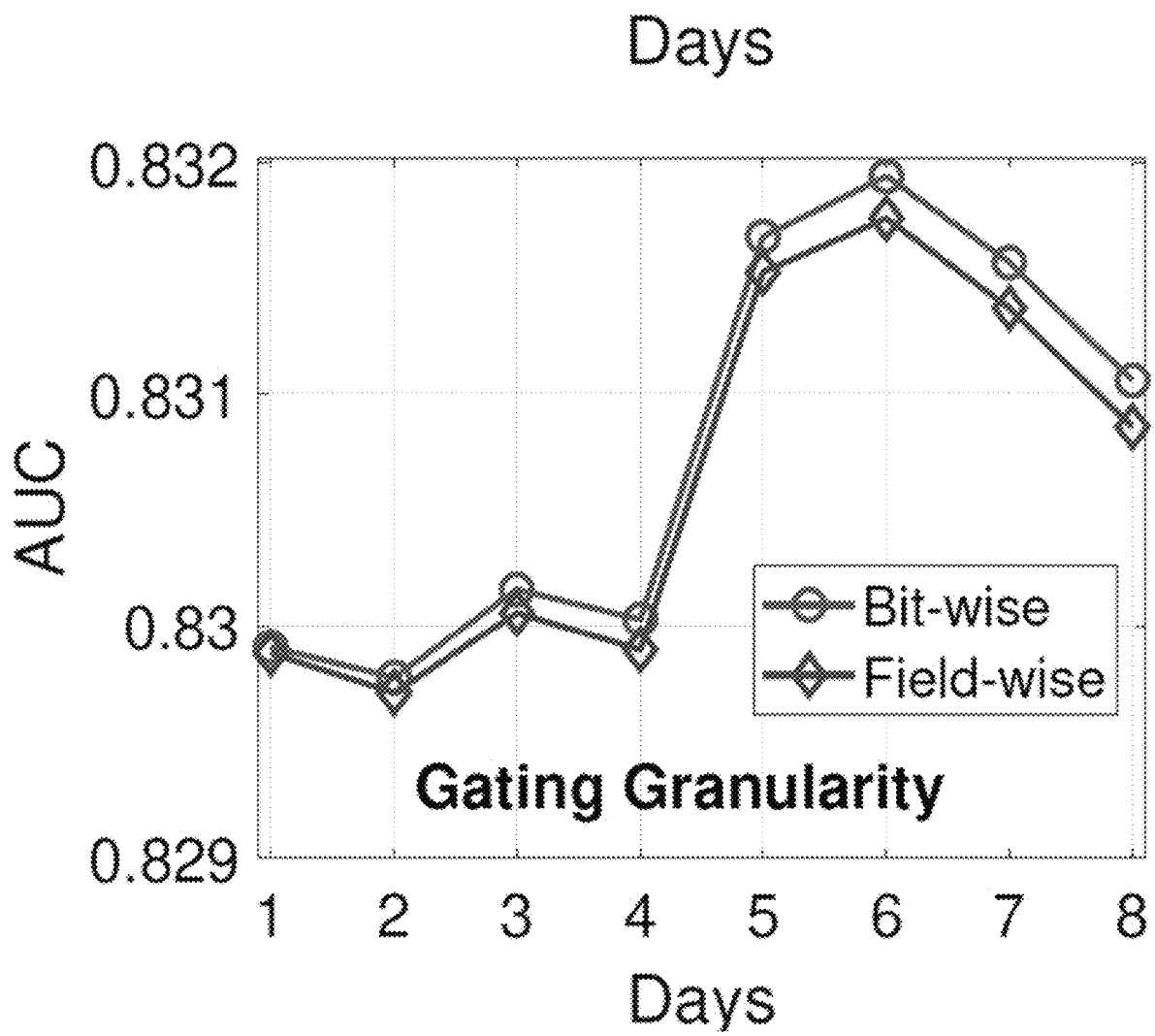
FIG. 6 shows the AUC results on UAMR, according to embodiments of the present disclosure.

In the gating layer, field-wise gating represents the feature-level importance of embeddings, while bit-wise gating learns the element-level importance. The field-wise representation focuses on coarse-grained information of feature embeddings, and the bit-wise gating contains the fine-grained importance of embeddings. In this section, experiments were conducted to explore the field-wise and bit-wise embedding gates. FIG. 6 shows the AUC results on UAMR, according to embodiments of the present disclosure. It was discovered that bit-wise gating performs better than field-wise gating. In experiments, embodiments with bit-wise gating were used.

d) Gating Strategy for Shared Parameters

Figure 7:
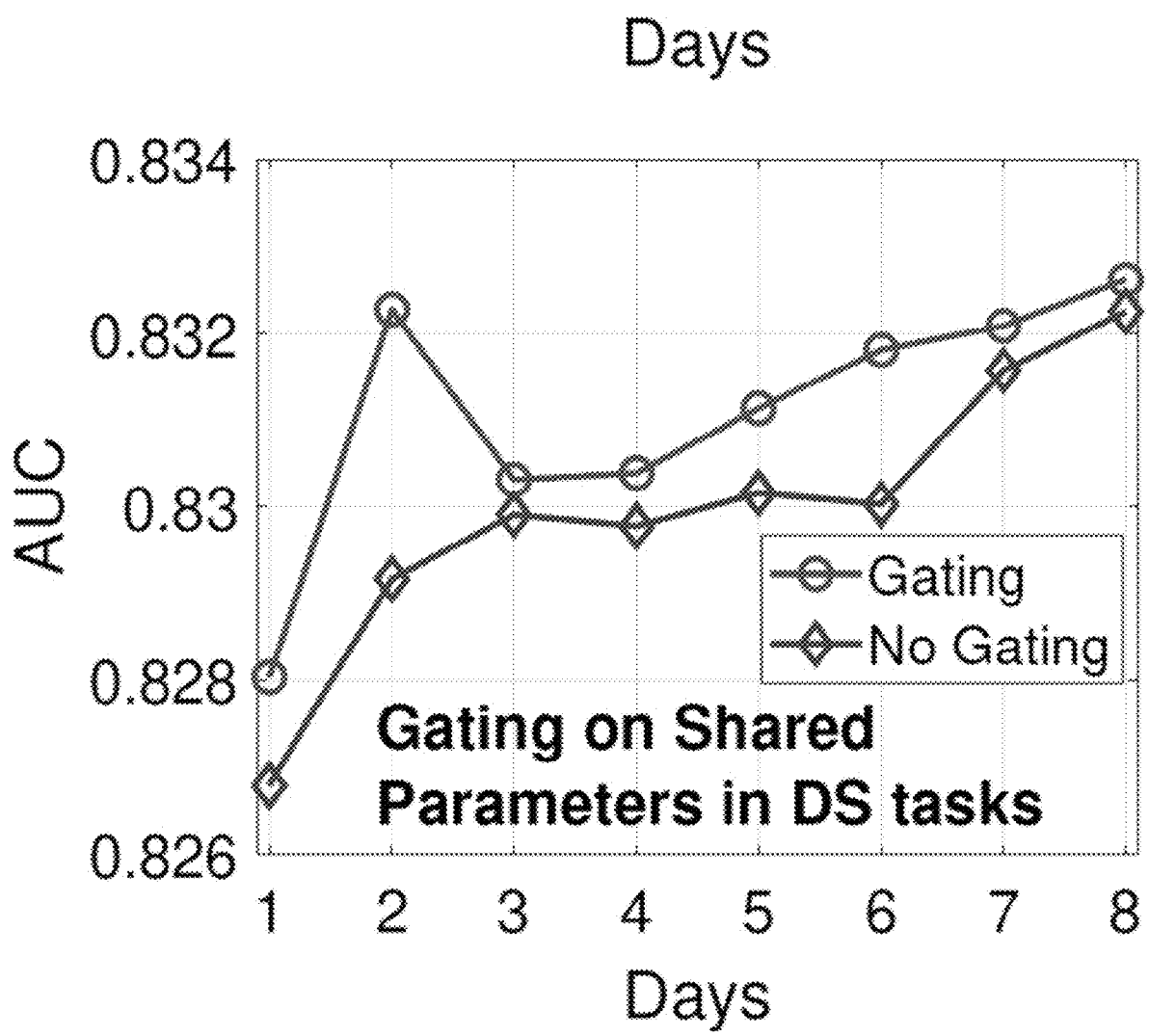
FIG. 7 shows the AUC performance on UAMR, according to embodiments of the present disclosure.

To improve training efficiency, GemNN embodiments may allow parameter sharing from upstream tasks to downstream tasks. In one or more embodiments, downstream tasks learn their gating weights for the shared parameters. On the contrary, in one or more embodiments, the shared parameters from UAR task may be directly concatenated with the output of the gating layer from lower-level tasks. In this section, it was studied how the gating mechanism on shared parameters influence the result of GemNN embodiments. FIG. 7 shows the AUC performance on UAMR, according to embodiments of the present disclosure. "DS" in the subplot indicates downstream. It was noticed that learning task-specific gating weights for shared parameters significantly outperforms its opposite. In the experiment, the gating weights for shared parameters in the downstream tasks were recomputed.

e) Ablation Study

To study how much contribution each component can make to the GemNN model, an ablation study was conducted and the results are provided in TABLE 2. The percentage value in "(•)" is the improvement over the baseline "GemNN w/o Gating or MTL" (multi-task learning). It was observed that MTL helps improve the offline CTR prediction with an average of 0.07% improvement. After adding the gating mechanism, the GemNN embodiment significantly improves the CTR prediction and achieves the best results. For the online CPM improvement metric, adding MTL to the baseline has 0.42% of improvement. After adding the gating mechanism, the full model GemNN embodiment obtained an improvement of 1.26% compared with the baseline.

TABLE 2

Ablation Study with "GemNN embodiment w/o Gating or MTL" as the baseline. "(%)" is absolute improvement for offline test, while "%" is relative improvement for online test.

| Embodiment | Offline Test | | | Online Test |
|---|---|---|---|---|
| | UAR | AMM | UAMR | CPM |
| GemNN w/o Gating or MTL | 0.8204 | 0.8330 | 0.8346 | 0% |
| GemNN w/o Gating | 0.8208 (+0.04%) | 0.8339 (+0.09%) | 0.8355 (+0.09%) | +0.42% |
| GemNN | 0.8221 (+0.17%) | 0.8355 (+0.25%) | 0.8373 (+0.27%) | +1.26% |

3. Some Observations

In this patent document, embodiments of a multi-task model to decompose the CTR prediction problem into three tasks in a coarse-to-fine manner were presented. Embodiments allow parameter sharing from upstream tasks to downstream tasks to avoid duplicated parameter learning. Meanwhile, in one or more embodiments, a gating mechanism enables modeling feature interactions and controls salient information flow from embedding layers to MLP. Tests achieved considerable improvements in both offline and online evaluation.

D. Computing System Embodiments

In one or more embodiments, aspects of the present patent document may be directed to, may include, or may be implemented on one or more information handling systems (or computing systems). An information handling system/ computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drive, solid state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 8:
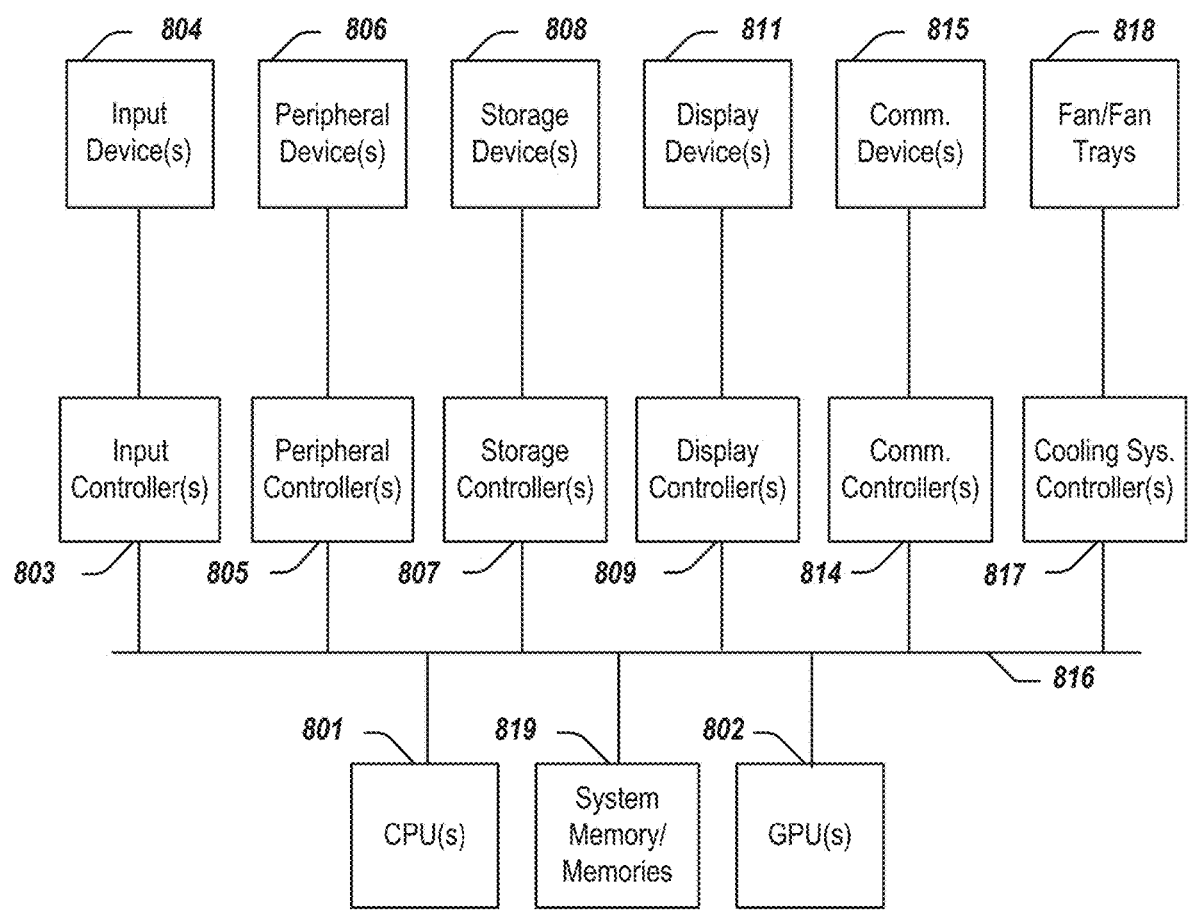
FIG. 8 depicts a simplified block diagram of a computing device/information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like, and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for delivering content to a user, the method comprising:
given a user query comprising one or more words and a set of candidate contents, using a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents;
using a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user;
using a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user; and
outputting the final set of candidate contents with style type information;

wherein:
at least one of the user-content ranking task model, the content-style matching task model, and the user-content-style ranking task model comprises a gating layer that is positioned between an embedding layer and a Multi-Layer Perception (MLP) and performs gating on concatenated features; and
parameters of a first layer of a Multi-Layer Perception (MLP) from the user-content ranking task model of the GemNN and the projected user-selection rate for each of the top candidate contents in the set of top candidate contents from the user-content ranking task model of the GemNN are shared with the content-style matching task model of the GemNN model and the user-content-style ranking task model of the GemNN model.

2. The computer-implemented method of claim 1 wherein model each of the Multi-Layer Perceptions comprises a plurality of layers.

3. The computer-implemented method of claim 1 wherein at least one of the user-content ranking task model, the content-style matching task model, and the user-content-style ranking task model comprises:
the embedding layer that receives input features and embeds them into embeddings;
a concatenation layer that concatenates the embeddings;
a normalization layer that receives an output from the concatenation layer;
the gating layer that receives the concatenated features from the normalization layer and performs gating related to the concatenated features; and
the Multi-Layer Perception (MLP) that receives an output of the gating layer.

4. The computer-implemented method of claim 3 wherein one or more of the input features are either one-hot representations or multi-hot representations in a multigroup categorical form.

5. The computer-implemented method of claim 1 wherein the shared parameters are concatenated with:
an embedding layer of the content-style matching task model of the GemNN model; and
an embedding layer of the user-content-style ranking task model of the GemNN model.

6. The computer-implemented method of claim 1 wherein:
the user-content ranking task model, the content-style matching task model, and the user-content-style ranking task model are jointly optimized during training, which comprises updating the parameters of the first layer of the Multi-Layer Perception (MLP) from the user-content ranking task model while freezing the shared projected user-selection rate for each of the top candidate contents in the set of top candidate contents from the user-content ranking task model.

7. The computer-implemented method of claim 1 wherein the content-style matching task model of the GemNN model comprises:
a two-tower neural network model to match content and possible style types, in which style-type feature embeddings are pre-computed and indexed.

8. The computer-implemented method of claim 1 wherein the contents are advertisements.

9. A system comprising:
one or more processors; and
a non-transitory computer-readable medium or media comprising one or more sets of instructions which, when executed by at least one of the one or more processors, causes steps to be performed comprising:

given a user query comprising one or more words and a set of candidate contents, using a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents;

using a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user;

using a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user; and outputting the final set of candidate contents with style type information;

wherein:
at least one of the user-content ranking task model, the content-style matching task model, and the user-content-style ranking task model comprises a gating layer that is positioned between an embedding layer and a Multi-Layer Perception (MLP) and performs gating on concatenated features; and parameters of a first layer of a Multi-Layer Perception (MLP) from the user-content ranking task model of the GemNN and the projected user-selection rate for each of the top candidate contents in the set of top candidate contents from the user-content ranking task model of the GemNN are shared with the content-style matching task model of the GemNN model and the user-content-style ranking task model of the GemNN model.

10. The system of claim 9 wherein each of the Multi-Layer Perceptions comprises a plurality of layers.

11. The system of claim 9 wherein at least one of the user-content ranking task model, the content-style matching task model, and the user-content-style ranking task model comprises:
the embedding layer that receives input features and embeds them into embeddings;
a concatenation layer that concatenates the embeddings;
a normalization layer that receives an output from the concatenation layer;
the gating layer that receives the concatenated features from the normalization layer and performs gating related to the concatenated features; and
the Multi-Layer Perception (MLP) that receives an output of the gating layer.

12. The system of claim 11 wherein one or more of the input features are either one-hot representations or multi-hot representations in a multigroup categorical form.

13. The system of claim 9 wherein the shared parameters are concatenated with:
an embedding layer of the content-style matching task model of the GemNN model; and
an embedding layer of the user-content-style ranking task model of the GemNN model.

14. The system of claim 9 wherein:
the user-content ranking task model, the content-style matching task model, and the user-content-style ranking task model are jointly optimized during training, which comprises updating the parameters of the first layer of the Multi-Layer Perception (MLP) from the user-content ranking task model while freezing the shared projected user-selection rate for each of the top candidate contents in the set of top candidate contents from the user-content ranking task model.

15. The system of claim 9 wherein the content-style matching task model of the GemNN model comprises:
a two-tower neural network model to match content and possible style types, in which style-type feature embeddings are pre-computed and indexed.

16. A non-transitory computer-readable medium or media comprising one or more sequences of instructions which, when executed by at least one processor, causes steps to be performed comprising:
given a user query comprising one or more words and a set of candidate contents, using a user-content ranking task model of a gating-enhanced multi-task neural network (GemNN) model, in which the user-content ranking task model of the GemNN model receives the user query and user-related data as inputs, to obtain a set of top candidate contents from the set of candidate contents and a projected user-selection rate for each of the top candidate contents in the set of top candidate contents;

using a content-style matching task model of the GemNN model and the set of top candidate contents, the projected user-selection rate for each of the top candidate contents, and potential style types for the top candidate contents as inputs to the content-style matching task model of the GemNN model to obtain a set of ranked style type information for at least some of the candidate contents in the set of top candidate contents based upon a predicted probability of being selected by the user;

using a user-content-style ranking task model of the GemNN model and the set of top candidate contents, the projected user-selection rate for each of the top candidate contents, and the set of ranked style type information for at least some of the candidate contents in the set of top candidate as inputs to the user-content-style ranking task model of the GemNN model to obtain a final set of candidate contents with style type information based at least in part on predicted probability of being selected by the user; and outputting the final set of candidate contents with style type information, wherein:
at least one of the user-content ranking task model, the content-style matching task model, and the user-content-style ranking task model comprises a gating layer that is positioned between an embedding layer and a Multi-Layer Perception (MLP) and performs gating on concatenated features; and parameters of a first layer of a Multi-Layer Perception (MLP) from the user-content ranking task model of the GemNN and the projected user-selection rate for each of the top candidate contents in the set of top candidate contents from the user-content ranking task model of the GemNN are shared with the content-style matching task model of the GemNN model and the user-content-style ranking task model of the GemNN model.

17. The non-transitory computer-readable medium or media of claim 16 each of the Multi-Layer Perceptions comprises a plurality of layers.

18. The non-transitory computer-readable medium or media of claim 16 wherein at least one of the user-content ranking task model, the content-style matching task model, and the user-content-style ranking task model comprises:
   the embedding layer that receives input features and embeds them into embeddings;
   a concatenation layer that concatenates the embeddings;
   a normalization layer that receives an output from the concatenation layer;
   the gating layer that receives the concatenated features from the normalization layer and performs gating related to the concatenated features; and
   the Multi-Layer Perception (MLP) that receives an output of the gating layer.

19. The non-transitory computer-readable medium or media of claim 18 wherein one or more of the input features are either one-hot representations or multi-hot representations in a multigroup categorical form.

20. The non-transitory computer-readable medium or media of claim 16 wherein the shared parameters are concatenated with:
   an embedding layer of the content-style matching task model of the GemNN model; and
   an embedding layer of the user-content-style ranking task model of the GemNN model.

* * * * *